Figures 1, 2:
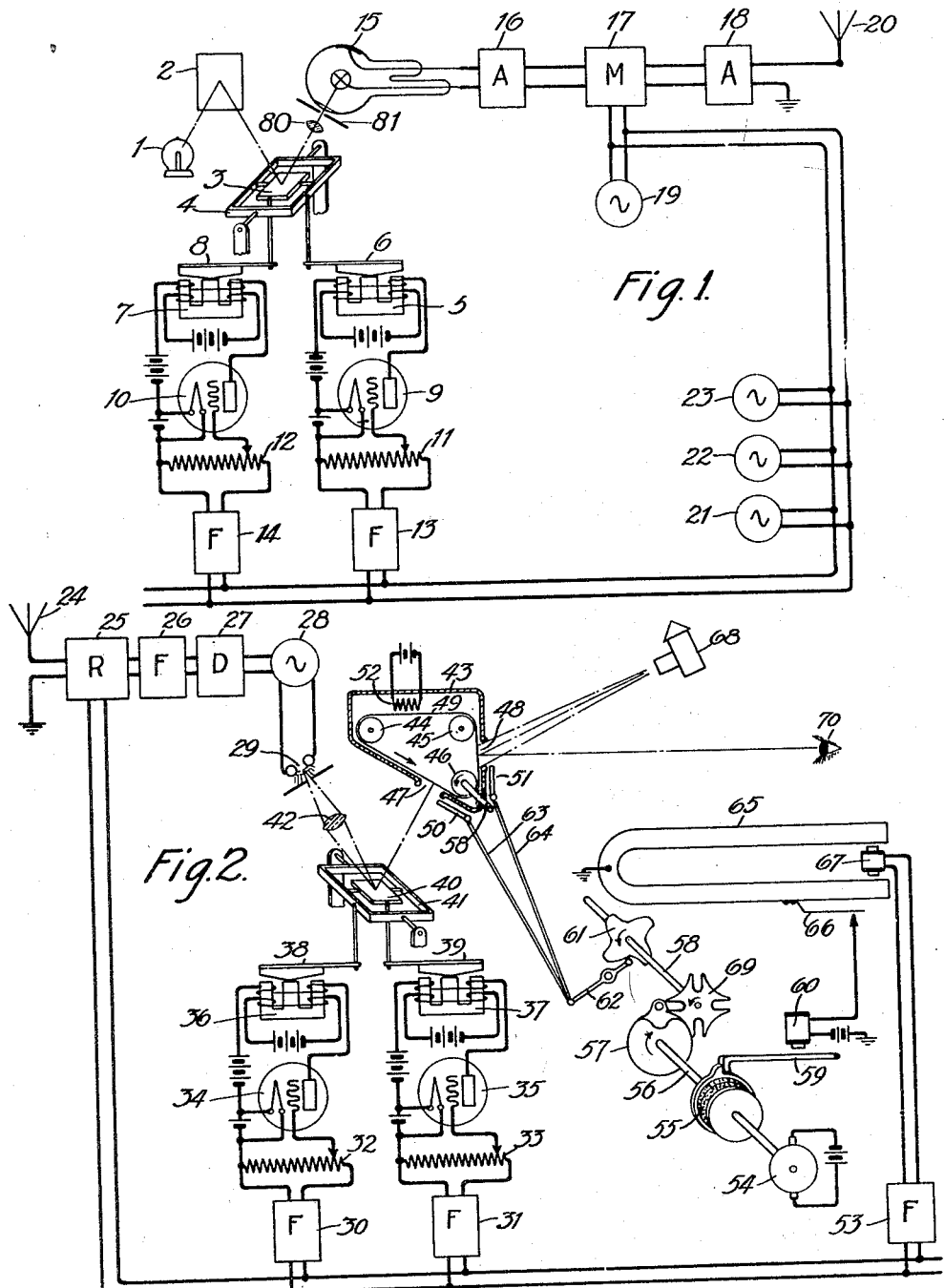

Nov. 8, 1927.

R. D. PARKER 1,648,058

ELECTROVISION

Filed Nov. 25, 1925

Inventor:
Ralzemond D. Parker
by g.e.fok Atty.

Patented Nov. 8, 1927.

1,648,058

UNITED STATES PATENT OFFICE.

RALZEMOND D. PARKER, OF BROOKLYN, NEW YORK, ASSIGNOR TO AMERICAN TELEPHONE AND TELEGRAPH COMPANY, A CORPORATION OF NEW YORK.

ELECTROVISION.

Application filed November 25, 1925. Serial No. 71,411.

This invention relates to the transmission of intelligence, and particularly to systems for the transmission of views by electricity.

The object of the invention is an improved method of transmitting, receiving and presenting to view images of the subject.

A feature of the invention relates to means for forming a complete image of the subject before it is presented to the view of the observer at the receiving station.

Another feature relates to means for enhancing the visibility of the image subsequently to its formation.

A further feature relates to an arrangement for erasing an image after it has been observed to avoid interference with other images subsequently formed.

Other features and advantages of the invention will become apparent from the following detailed description and appended claims.

In the drawing, Figure 1 shows a sending station and Fig. 2 illustrates a receiving station.

The sending station is equipped with an optical system comprising a source of light 1 and a vibratory mirror 3 for scanning a subject, the image of which it is desired to transmit to the receiving station. A lens 80 is placed between the mirror and photoelectric cell so that an image will be formed in the plane of an aperture 81 situated in front of the cell. The function of the mirror is to move the image across the slit so that light from each elementary area of the picture will successively act upon the cell.

The mirror 3 may be of any construction suitable for exploring or scanning the surface of the subject 2. As shown, the mirror 3 is pivotally mounted in a rack 4, the rack also being mounted for oscillations about an axis at right angles to the axis of the mirror. Two electromagnets 5 and 7 having armatures 6 and 8 are provided, one for oscillating the rack 4 and the other for oscillating the mirror 3. The magnets 5 and 7 are supplied with magnetizing current from the output circuits of the electron discharge devices 9 and 10, respectively. Energy is supplied to the devices 9 and 10 by separate sources such as the oscillation generators 21 and 22. By arranging these generators to produce alternating current of different frequencies, the mirror 3 may be caused to vibrate at a given rate about one axis and at a different rate about the other axis.

The filters 13 and 14 are of well-known construction and serve to pass exclusively currents having a given range of frequencies. The current produced by the oscillator 21 may pass the filter 13 and flow through the potentiometer 11. Thus, a variable potential is impressed upon the input circuit of the device 9. In like manner, the current produced by the oscillator 22 is passed by the filter 14 and flows through the potentiometer 12.

The light beam is directed by the mirror 3 to a photoelectric cell 15 or other similar device. In the well-known manner, an electric current is generated by the cell 15 which varies in intensity with the characteristics or tone values of the subject 2. The photoelectric current may be amplified by an amplifier 16 and then impressed upon a modulator 17 which serves to modulate a carrier current generated by the oscillator 19. The modulated carrier current may again be amplified by an amplifier 18 and then impressed on the antenna 20 for transmission.

It will also be noted that a part of the current generated by the oscillators 21 and 22 is impressed upon the antenna 20 and transmitted to the distant station either as modulations of a separate carrier wave or, as shown, as modulations of the carrier produced by generator 19.

At the receiving station there is provided an optical system including a mirror 40 similar to the mirror at the sending station and mounted in a frame 41 for vibratory movement. The mirror 40 is driven by magnets 36 and 37 having armatures 38 and 39, respectively. The magnets 36 and 37 are energized by current in the output circuits of the electron discharge devices 34 and 35, the input circuits of which are connected through the potentiometers 32 and 33 to the filters 30 and 31, respectively.

The optical system at the receiving station also includes a movable element such as an endless belt or carrier 49 mounted for movement on pulleys 44, 45 and 46. The endless belt 49 is enclosed within a light-proof chamber 43 having two windows 47 and 48 therein.

The carrier 49 is driven through the pulley 46 which is mounted upon a shaft 58.

The shaft 58 is driven through suitable mechanical connections by means of a motor 54. The motor 54 constantly tends to rotate the shaft 56 through a friction clutch connection 55. The shaft 56 is restrained, however, by means of the armature 59 of the electromagnet 60. Upon energization of the magnet 60, the shaft 56 is released and through the mechanical connections 57 and 69 drives the shaft 58 through a fractional part of a revolution. Upon the next release of the shaft 56 the shaft 58 is advanced through another fractional part of a revolution, and so on.

The shaft 58 carries a cam 61 which acts through levers 62, 63 and 64, to repeatedly close and open the windows 47 and 48 by means of the shutters 50 and 51, respectively.

The electromagnet 60 is operated from a low frequency tuning fork 65 as will be explained hereinafter.

The receiving station is further equipped with a source of radiation 29 whose intensity is controlled by the received picture currents and which is preferably arranged to produce light having frequencies found in the ultraviolet region of the spectrum. This device may be a spark gap between metal electrodes either in air or in a vacuum or it may be a discharge tube constructed of quartz and containing some vapor such as mercury.

It may be necessary where the source is extended and irregular in shape to provide an aperture which will be illuminated by the source and its image formed on the belt 49. This light is directed by a quartz lens 42 to the surface of the mirror 40 and thence to the phosphorescent belt where a small elementary image of suitable size is formed. Instead of lens 42, a first surface mirror may be used if desirable, or the lens may be eliminated and shields or slits used.

A brief description will now be given of the manner in which the system operates.

Assume that it is desired to transmit images of a subject 2 which may be either still or moving. The subject is located at the proper point in the optical system and by means of the mirror 3 is scanned while illuminated by the light furnished by the source 1. The beam of light falling upon the cell 15 produces an electric current, the intensity of which varies in accordance with the characteristics of the subject 2. Depending upon the frequencies of the currents produced by the oscillators 21 and 22 and their relation to each other, the subject 2 will be completely scanned a given number of times per second. The nature of the scanning will be line by line or spiral as disclosed by Nicholson Patent No. 1,470,696, granted October 16, 1923, depending upon relation between the above mention circuits. It has been found that about fifteen complete scannings per second are suitable to sustain vision. After amplification and modulation the modulated carrier wave is transmitted by the antenna 20. Also, the waves produced by the oscillators 21 and 22 are continuously radiated by the antenna 20 as modulations of the carrier current.

Moreover, a fourth oscillator 23 is provided at the sending station for producing a wave having a desired frequency, which is continuously radiated by the antenna 20 as modulations of the carrier waves. It will, of course, be understood that the several signal currents transmitted are separated from each other in any suitable manner at the receiving station. The wave generated by the oscillator 23 is for oscillating the tuning fork 65 at the receiving station and preferably has a frequency equal to the rate at which the subject 2 is scanned. Accordingly, there will be a definite relation between the frequency of the oscillator 23 and that of the oscillators 21 and 22. This relation may be maintained in any desired manner. For example, one oscillator may have a frequency which is a harmonic of the other.

At the receiving station the carrier waves are received by the antenna 24 and delivered to the receiving equipment 25, which may contain filters and amplifiers as required. The modulated carrier wave is passed by the filter 26 and impressed upon the input circuit of a demodulator 27. The output current from the demodulator 27 serves to modulate the output current of a power oscillator 28. The power oscillator 28 supplies current for lighting the source of radiation 29. Accordingly, the incoming modulated carrier wave which represents the subject 2 causes the intensity of the source to vary in accordance with the shade characteristics of the subject at the sending station.

The beam of light from the source 29 is reflected by the mirror 40 and is caused to explore or scan an area of the belt 49 exposed by the open window 47 in exact synchronism and correspondence with the scanning of the subject 2 at the sending station. The belt 49 has its surface coated with any suitable phosphorescent or similar substance such as zinc sulphide. The effect of the variable intensity of the ultra-violet light is to produce an image of the subject on the surface of the belt 49 opposite the window 47.

As soon as the image has been completely formed on the surface of the belt 49, said belt is caused to advance through a distance sufficient to bring the image opposite the window 48. This is accomplished by the motor 54 and its associated apparatus, as will now be explained.

The incoming synchronizing wave produced by the oscillator 23 is selected by the filter 53 and through suitable equipment causes the operation of the driving magnet 67 of the fork 65. For each vibration of the fork 65 a circuit is closed at contact 66 for energizing the magnet 60. Thus, for each energization of the magnet 60, the shaft 56 is released and drives the shaft 58 through a fractional part of a revolution. The shaft 58 in rotating causes the cam 61 to engage the lever 62, whereby the shutters 50 and 51 are advanced to close the windows 47 and 48, respectively. The various elements are so timed with respect to each other that the windows are closed at the completion of the formation of the image on the belt 49. Immediately upon the closure of the windows 47 and 48 the belt 49 is advanced to bring the image opposite the window 48. Thereupon the shutters are withdrawn and the windows are opened. The opening of the window 48 presents the image to view, whereas the opening of the window 47 presents a fresh surface of the belt 49 for the formation of the next image.

In order that the visibility of the image at the window 48 may be enhanced, there is provided a source 68 of light of suitable frequency such as found in the infra-red portion of the spectrum. Light from the source 68 shines through the window 48 and by acting upon the surface of the belt 49, improves the visibility of the image.

As the belt advances to bring a new image opposite the window 48, the old image is carried past some suitable erasing device, such as a heating coil 52. In this manner the old images are thoroughly erased so as not to interfere with the formation of fresh images when corresponding portions of the belt 49 are again presented to the scanning beam shining through the window 47.

Thus, with the observer located at the point 70, there appears through the window 48 a continuous succession of images giving, in effect, a sustained view of the subject 2 at the distant station.

In order that exact synchronism may be maintained between the mirrors 3 and 40, the synchronizing waves produced by the oscillators 21 and 22 are received at the receiving station and selected by the respective filters 30 and 31. As already explained, these synchronizing waves cause the operation of the magnets 36 and 37 to impart motion to the mirror 40, which corresponds to the motion of mirror 3.

What is claimed is:

1. In a system for the transmission of images, sending and receiving stations, a subject at the sending station, optical systems at said stations for producing beams of light and including mirrors for directing said beams, means for causing the optical system at the sending station to scan said subject, means for maintaining the mirror at the receiving station in synchronism with the mirror at the sending station, means co-operating with the optical system at the sending station for transmitting electric energy representing the characteristics of said subject, means at the receiving station responsive to said energy for varying the intensity of the beam of light thereat, means acted upon by the beam of light at said receiving station to form a succession of images of said subject, and means for successively presenting said images to view following the complete formation thereof.

2. In a system for the transmission of images, a sending station and means thereat for transmitting energy representing the characteristics of a given subject, a receiving station, a light sensitive movable element at the receiving station, means responsive to the energy received for forming a succession of images upon said movable element, and automatic means to advance said element upon the complete formation of each image to bring such image into view.

3. In a system for the transmission of vision, a sending station having means for transmitting electric energy representing the characteristics of a subject, a receiving station, a movable element thereat having a sensitized surface, a source of light responsive to the received energy for forming a succession of images of said subject upon said sensitized surface, and means following the complete formation of each image for advancing said element to bring the image into view.

4. The combination in a system for the transmission of vision of a sending station having means for transmitting electric energy representing the characteristics of a given subject, a receiving station, an endless belt thereat having a light-sensitive surface, an optical system responsive to energy received for forming upon the surface of said belt a succession of images of the subject, a motor for driving said belt, and means for controlling the operation of said belt whereby each image is advanced into view following the complete formation thereof.

5. The combination in a system for the transmission of images of a sending station having means for generating and transmitting energy representing the characteristics of a given subject, a receiving station, means at the receiving station responsive to the incoming energy to form a succession of images of said subject, automatic means for advancing each image to view following the complete formation thereof, and means to enhance the visibility of said images.

6. In a system for the transmission of vision, a sending station having means for transmitting electric energy representing the characteristics of a subject, a receiving station, a movable sensitized element at the receiving station, means responsive to the energy received for forming a series of images upon said sensitized element, means following the formation of each image for advancing said element to present said image to view, and a source of light shining upon each image and having a wave length suitable for enhancing the visibility of said image.

7. The combination in a television system of a sending station having means thereat for transmitting electric energy representing the shade characteristics of a given subject, a receiving station having a movable element and means responsive to the energy received for forming a succession of separate images of said subject upon said movable element, means for advancing said element to present the images to view, and means for erasing said images after they have been presented to view.

8. The method of television which comprises exposing a sensitized surface while at rest to the action of light modulated in accordance with an instantaneous aspect of the subject to modify the sensitive material in accordance with said instantaneous aspect, and moving the sensitized surface so as to cause the modified portion a short time afterward to come into a position for enabling an image corresponding to said instantaneous aspect to be formed upon the eye of the observer.

9. The method of television which comprises exposing a sensitized surface while at rest to the action of light modulated in accordance with an instantaneous aspect of the subject to modify the sensitive material in accordance with said instantaneous aspect, moving the sensitized surface so as to cause the modified portion a short time afterward to come into a position for enabling an image corresponding to said instantaneous aspect to be formed upon the eye of the observer, and repeating this operation for various instantaneous aspects of the subject and different portions of said sensitized surface.

10. A television system comprising means for holding a sensitized surface, a light source controlled by the incoming image currents to modify a portion of said sensitized surface in accordance with an instantaneous aspect of a moving or changing subject, and means for moving said portion of sensitized surface so as to cause it a short time afterward to come into a position for enabling an image corresponding to said instantaneous aspect of the subject to be formed upon the eye of the observer.

11. A television system comprising means for holding a light sensitive surface, a light source controlled by the received image currents for modifying a portion of said light sensitive surface while at rest in accordance with an instantaneous aspect of a moving or changing subject, and means for intermittently moving said light sensitive surface to permit different portions thereof to be modified in accordance with successive instantaneous aspects of the subject and a short time afterward to enable images corresponding to said successive instantaneous aspects to be formed upon the eye of the observer.

In testimony whereof, I have signed my name to this specification this 23rd day of November, 1925.

RALZEMOND D. PARKER.